(12) United States Patent
Hu et al.

(10) Patent No.: US 12,001,278 B2
(45) Date of Patent: Jun. 4, 2024

(54) WIDE STRIPE DATA STORAGE AND CONSTRUCTING, REPAIRING AND UPDATING METHOD THEREOF

(71) Applicant: HUAZHONG UNIVERSITY OF SCIENCE AND TECHNOLOGY, Hubei (CN)

(72) Inventors: Yuchong Hu, Hubei (CN); Liangfeng Cheng, Hubei (CN); Qiaori Yao, Hubei (CN); Zhaokang Ke, Hubei (CN); Jia Xu, Hubei (CN)

(73) Assignee: HUAZHONG UNIVERSITY OF SCIENCE AND TECHNOLOGY, Hubei (CN)

(*) Notice: Subject to any disclaimer, the term of this patent is extended or adjusted under 35 U.S.C. 154(b) by 0 days.

(21) Appl. No.: 17/865,313

(22) Filed: Jul. 14, 2022

(65) Prior Publication Data
US 2022/0358008 A1  Nov. 10, 2022

Related U.S. Application Data

(63) Continuation of application No. PCT/CN2021/100281, filed on Jun. 16, 2021.

(30) Foreign Application Priority Data

Feb. 20, 2021 (CN) .......................... 202110193270.9

(51) Int. Cl.
*G06F 11/00* (2006.01)
*G06F 11/10* (2006.01)

(52) U.S. Cl.
CPC ...... *G06F 11/1004* (2013.01); *G06F 11/1076* (2013.01)

(58) Field of Classification Search
None
See application file for complete search history.

(56) References Cited

U.S. PATENT DOCUMENTS 10,417,094 B1   9/2019  Levy
11,467,905 B1 * 10/2022  Hu ...................... H03M 13/373
(Continued)

FOREIGN PATENT DOCUMENTS

CN   105302500   2/2016
CN   108170555   6/2018
(Continued)

OTHER PUBLICATIONS

Google Scholar/Patents search—text refined (Year: 2022).*
(Continued)

*Primary Examiner* — Christopher S McCarthy
(74) *Attorney, Agent, or Firm* — JCIPRNET

(57) ABSTRACT

A wide stripe data storage and a constructing, repairing and updating method thereof are provided. In the wide stripe data storage, a stripe is (n, k, r, z) and comprises local groups and a global group comprising a rack for storing global parity blocks; each local group comprises $$\frac{r+1}{c}$$

racks, each rack has different storage nodes for storing data blocks or local parity blocks, the total number of the data blocks and the local parity blocks in each rack is c; one local parity block and r data blocks are stored in each local group; the number of the storage node in each rack is greater than or equal to c; c is smaller than or equal to the node fault-tolerant capability f of the wide stripe based on fault-tolerant attribute of the rack; the number of the global parity blocks is f−1; z is the total number of the racks.

10 Claims, 4 Drawing Sheets

(56) References Cited

U.S. PATENT DOCUMENTS

| | | | |
|---|---|---|---|
| 2014/0310571 A1* | 10/2014 | Fetterly | G06F 11/1076 714/764 |
| 2016/0350186 A1* | 12/2016 | Blaum | H03M 13/293 |
| 2020/0127684 A1* | 4/2020 | Park | H03M 13/2942 |
| 2020/0348855 A1 | 11/2020 | Vaknin | |
| 2021/0208782 A1* | 7/2021 | Zhu | G06F 11/1076 |
| 2022/0035532 A1 | 2/2022 | Vaknin | |

FOREIGN PATENT DOCUMENTS

| | | |
|---|---|---|
| CN | 109491835 | 3/2019 |
| CN | 110347526 | 10/2019 |
| CN | 111444042 | 7/2020 |
| CN | 112835738 | 5/2021 |

OTHER PUBLICATIONS

Google Patents present application prior art search (Year: 2022).*
Google Patents similar art search of present application (Year: 2022).*
Google Scholar/Patent search—text refined (Year: 2023).*
Usenix, "Exploiting Combined Locality for Wide-Stripe Erasure Coding in Distributed Storage", Hu et al., Feb. 2021 (Year: 2021).*
Google Scholar/Patents search—text refined (Year: 2023).*
Google Scholar/Patents search—text refined (Year: 2024).*
Google Lens search—figure 2 (Year: 2024).*
"International Search Report (Form PCT/ISA/210) of PCT/CN2021/100281," mailed on Nov. 19, 2021, pp. 1-5.
"Written Opinion of the International Searching Authority (Form PCT/ISA/237) of PCT/CN2021/100281," mailed on Nov. 19, 2021, pp. 1-4.
Zhang Hang et al., "Erasure code with low recovery-overhead in distributed storage systems," Journal of Computer Applications, vol. 40, Oct. 2020, pp. 2942-2950.

* cited by examiner

WIDE STRIPE DATA STORAGE AND CONSTRUCTING, REPAIRING AND UPDATING METHOD THEREOF

CROSS-REFERENCE TO RELATED APPLICATION

This application is a continuation of international PCT application serial no. PCT/CN2021/100281, filed on Jun. 16, 2021, which claims the priority benefit of China application no. 202110193270.9, filed on Feb. 20, 2021. The entirety of each of the above mentioned patent applications is hereby incorporated by reference herein and made a part of this specification.

BACKGROUND

Technology Field

The invention belongs to the field of reliable data storage of computers, and more specifically, relates to a wide stripe data storage and a constructing, repairing and updating method thereof.

Description of Related Art

With the rapid development of computers and the Internet, the total amount of data generated by humans has an explosive exponential growth. How to store data in a low-cost and reliable manner has become an urgent problem to be solved in the industry. Compared with the conventional replication technology, erasure coding is widely used in distributed storage systems as a storage redundancy mechanism with high storage efficiency and high reliability.

However, compared with the replication technology, erasure coding may cause additional computation and network transmission overhead during data recovery, that is, the data repair overhead is increased. Moreover, the longer the encoding stripe, the greater the repair overhead. In this case, previous studies have shown that data repair performance can be improved by mining the locality in storage systems; in parity block locality, by grouping the data blocks in the stripe, an additional local parity block is generated for each group, so that the local parity block can be used for quick repair when a single data block is repaired, but the storage overhead of parity block locality is large; in topological locality, by locating different data blocks of the same stripe in the same rack, data block repair operations are allowed to be performed quickly through the intra-bandwidth in the rack without performing cross-rack data block transmits. However, the repair overhead of topology locality is still higher than that of parity block locality.

In a conventional erasure code storage system, the (n, k) of the encoding stripe would not be configured very large generally, where k is the number of data blocks, and n is the total number of data blocks and parity blocks, such as (n,k)=(9,6) in HDFS (Hadoop Distributed File System), (14,10) in f4, (16,12) in Azure, (18,15) in Pelican, and so on. In this case, n/k is still large, that is, the storage overhead of the distributed storage system is still large. By designing larger (n, k) parameters, such as (132, 128), n/k approaches 1, and the storage overhead can be greatly reduced. However, larger (n, k) encoding parameters may increase the repair overhead of the data block, so it is of great significance to design a new locality repair strategy to reduce the repair overhead of the data block.

SUMMARY

In view of the defects of the prior art, the invention aims at providing a wide-stripe data storage structure and a constructing, repairing and updating method thereof and aiming at solving the problem of relatively wide storage overhead and repair overhead in the existing erasure code storage system.

To attain the aims, the invention provides a wide stripe data storage. A stripe is (n, k, r, z) and includes local groups and a global group; the global group includes a rack for storing global parity blocks; each local group includes $$\frac{r+1}{c}$$

racks, and different storage nodes are disposed in each rack; data blocks or local parity blocks are stored at the different storage nodes, and the total number of the data blocks and the local parity blocks in each rack is c.

Each local group stores one local parity block and r data blocks; the number of the storage node in each rack is greater than or equal to c; based on a fault-tolerant attribute of the rack, c is less than or equal to node fault-tolerant capability f of a wide stripe; n is the total number of all data blocks and parity blocks in a stripe; k is the number of the data block in the wide stripe; the number of global parity blocks is f−1; z is a total number of the racks.

The wide stripe data storage provided by the invention supports a plurality of stripes to adopt an encoding technology at a plurality of nodes synchronically.

Based on the wide stripe data storage provided by the invention, the invention provides a constructing method of the wide stripe data storage, including steps as follows:
    trading off a storage overhead $$\frac{k + \lceil k/r \rceil + f - 1}{k}$$

of the stripe and a repair overhead $$\frac{r+1}{f} - 1$$

across racks based on parameters of the stripe, and disposing the data blocks in each local group, where the parameters include a total number n of all data blocks and parity blocks in the stripe, k data blocks in the wide stripe, and node fault-tolerant capability f;
when considering a rack fault-tolerant attribute and a data block repair overhead, setting the number of data blocks stored in each rack;
calculating the number of racks in each local group based on the number of the data blocks in each local group and the number of data blocks owned by each rack;
by an Azure-LRC (Locally Repairable Code) method, performing a linear encoding on all data blocks of each local group to generate the local parity block; and calculating a global parity block in a global group by RS (Reed-Solomon) encoding of the Cauchy matrix;
where the global parity block is placed at different storage nodes in the same rack.

Preferably, a constructing method of the local parity block and the global parity block includes:

randomly selecting a plurality of nodes in one of the racks, and dividing the data blocks in the stripe into the local groups in sequence;

distributing the data blocks of all local groups to the nodes in the same rack in sequence by using the local group as a unit;

by the Azure-LRC method, performing the linearly encoding on all data blocks of a first local group to generate the local parity blocks and f−1 intermediate results in the local group; where the f−1 intermediate results are transmitted to a next local group;

by the Azure-LRC method, encoding the data blocks in its own local group to generate a corresponding local parity block at a node where the next local group is located, and using the f−1 intermediate results generated by the previous local group to generate new f−1 intermediate results; where the f−1 intermediate results generated by the next local group are transmitted to a next local group;

and so on, until all local groups complete the corresponding local parity block, and using f−1 intermediate results generated by a last local group as the global parity block;

distributing the data blocks, the local parity blocks, and the global parity blocks to corresponding racks.

Preferably, an updating method of the global parity block includes steps as follows:

a. generating a difference data block on a storage node where an updated data block is located;

b. transmitting a difference to any storage node of the rack of the global group by transmission across racks;

c. using the difference to update the global parity block of the storage node in step b;

d. transmitting the difference from the storage node in step b to the storage node of the remaining global parity blocks through an intra-bandwidth in the rack;

e. using the difference to update the remaining global parity blocks; and preferably, a replacing method of the rack of the local parity block includes:

taking the local group as a unit, adding 1 to a number of updates of the corresponding rack when the data block in each rack is updated;

comparing the number of updates of each rack in the local group every preset time period, and changing positions of the local parity block in the local group and any data block in the rack with a most frequent update.

Preferably, a repairing method of the data block in the local group includes:

in the local group, selecting a non-failed storage node as a requestor in the rack where a failed data block is located, and selecting a storage node in other racks each as a local repairer;

through the local repairer, collecting all the data blocks and the local parity blocks of a same stripe in the rack where it is located, calculating an XOR value, and transmitting the XOR value to the requestor;

through the requestor, collecting the remaining data blocks and local parity blocks in the rack except the failed data block, and combining all the XOR values transmitted by the local repairer to decode and obtain the failed data block; and a repairing method of the storage nodes comprises:

recording all nodes ID that have recently acted as the requestor and the local repairer through an LRU double-linked list;

using a hash table to map real addresses of the nodes that have acted as the requestor and the local repairer in the LRU double-linked list;

selecting nodes that have not acted as the requestor and the local repairer recently as the requestor and the local repairer when repairing a next data block.

Based on the wide stripe data storage provided by the invention, the invention provides an updating method of a corresponding global parity block, including steps as follows:

a. generating a difference data block on the storage node where an updated data block is located;

b. transmitting a difference to any storage node of the rack of the global group by transmission across racks;

c. using the difference to update the global parity block of the storage node in step b;

d. transmitting the difference from the storage node in step b to the storage node of the remaining global parity blocks through an intra-bandwidth in the rack;

e. using the difference to update the remaining global parity blocks.

Based on the wide stripe data storage provided by the invention, the invention provides the updating method of the corresponding local parity block, including steps as follows:

taking the local group as a unit, adding 1 to a number of updates of the corresponding rack when the data block in each rack is updated;

comparing the number of updates of each rack in the local group every preset time period, and changing positions of the local parity block in the local group and any data block in the rack with a most frequent update.

Based on the wide stripe data storage provided by the invention, the invention provides a repairing method of the data block in a corresponding local group, including steps as follows:

in the local group, selecting a non-failed storage node as a requestor in the rack where a failed data block is located, and selecting a storage node in other racks each as a local repairer;

through the local repairer, collecting all the data blocks and the local parity blocks of a same stripe in the rack where it is located, calculating an XOR value, and transmitting the XOR value to the requestor;

through the requestor, collecting the remaining data blocks and local parity blocks in the rack except the failed data block, and combining all the XOR values transmitted by the local repairer to decode and obtain the failed data block.

Based on the wide stripe data storage provided by the invention, the invention provides a repairing method of the storage nodes in a corresponding local group, including steps as follows:

recording all nodes ID that have recently acted as a requestor and a local repairer through an LRU double-linked list;

using a hash table to map real addresses of the nodes that have acted as the requestor and the local repairer in the LRU double-linked list;

selecting nodes that have not acted as the requestor and the local repairer recently as the requestor and the local repairer when repairing a next data block.

In general, compared with the prior art, the technical solutions conceived by the invention have the following beneficial effects:

in the method and structure for reliable storage of data with low overhead based on wide stripes provided by the invention, by combining parity block locality and topology locality (a local group includes multiple racks, and the racks include multiple storage nodes), the repair overhead of the data block accordingly can be effectively reduced, and both the repair overhead and the storage overhead are reduced compared with those of the prior art.

In the invention, by analyzing a repair parameter r (data blocks of a local group obtained by trading off the repair overhead and the storage overhead) for configuring a data block, the trade-off between the storage overhead and the repair overhead across racks is implemented, and this provides the storage service provider with the optimal solution for configuring parameters in different scenarios.

The wide stripe data storage provided by the invention supports multiple stripes to adopt the encoding technology at multiple nodes synchronically (the configuration of the local parity block and the global parity block in the invention supports synchronic execution of multiple stripes, and multiple nodes on the same rack to encode data blocks of different local groups respectively can be adopted) rather than the encoding technology of the prior art in which all data blocks are encoded at the same node, which improves the encoding efficiency of data blocks in a wide stripe.

In the invention, the method for updating the parity block inside the rack for the local parity block and the global parity block is adopted, which improves the update efficiency of the data blocks in the wide stripe. Specifically, in the update of the global parity block, the difference data block is transmitted across racks to any storage node in the rack of the global group for one time. Subsequently, the difference is transmitted to the storage nodes of the remaining global parity blocks through the intra-bandwidth in the racks of the global group, and compared with the prior art, the update of the global parity block is applicable to the transmission across racks, which improves the update efficiency of the global parity block. In the update of the parity blocks of the local group, the positions of the local parity block in the local group and any data block in the rack with the most frequent update are exchanged every preset time period, which also reduces the number of transmissions across racks and improves the update efficiency of local parity blocks.

In the prior art, both n and k in (n, k) of the stripe are not very wide because larger values of n and k cannot be compatible with lower repair overhead and lower storage overhead synchronically. However, the wide stripe data storage and method provided by the invention not only can support the values of n and k to be in the order of hundreds but also can ensure that the repair overhead and storage overhead are kept low.

DESCRIPTION OF THE EMBODIMENTS

In order to make the objectives, technical solutions, and advantages of the invention clearer, embodiments accompanied with drawings are described to illustrate the invention in detail below. It should be understood that the specific embodiments described here are only used to explain the invention, but not to limit the invention.

Figure 1:
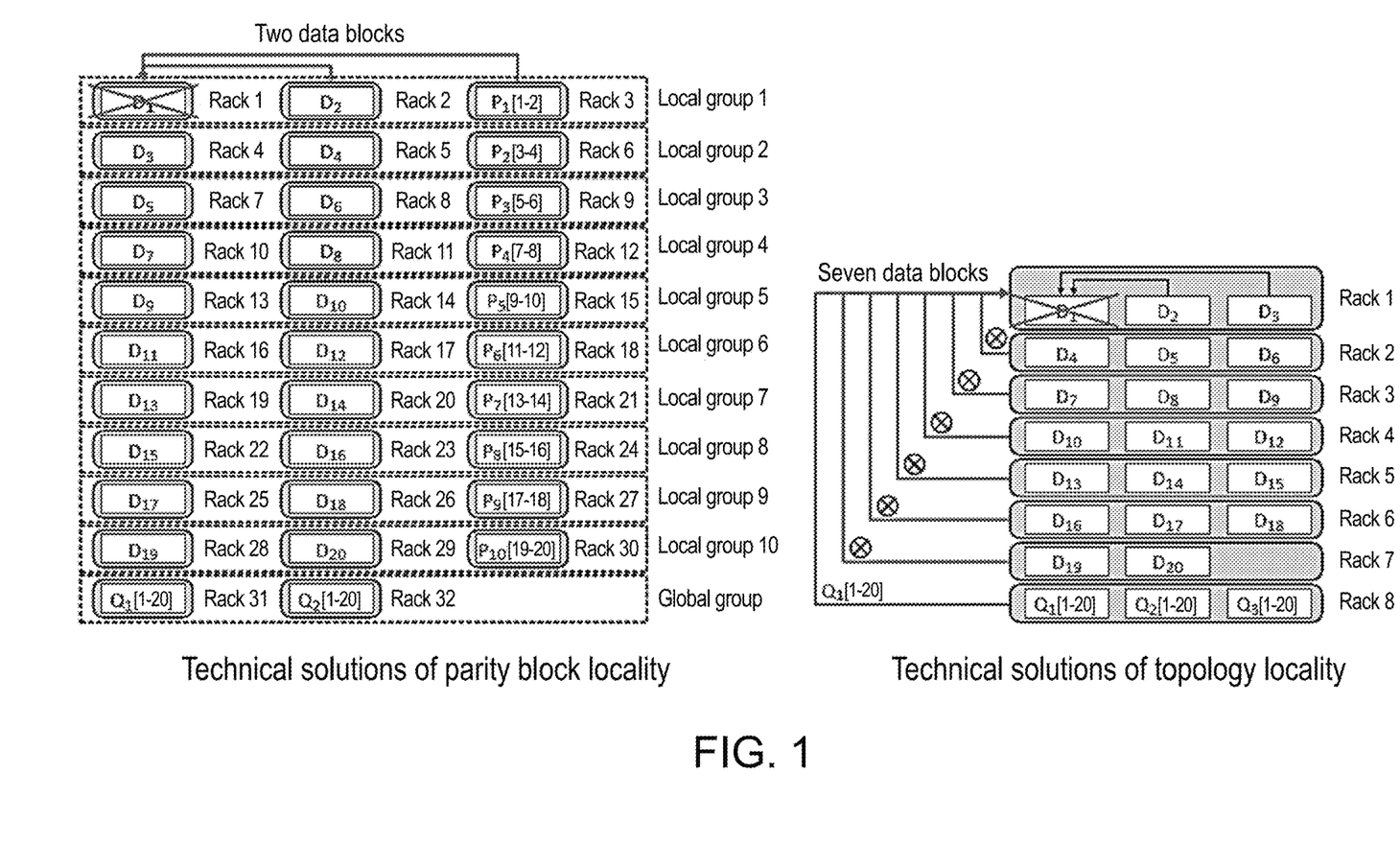
FIG. 1 is a deployment diagram of the conventional technical methods of parity block locality and topology locality provided by the invention.

Before introducing the invention, a brief introduction to a wide-stripe deployment method applying parity block locality and topology locality is illustrated first. As shown in FIG. 1, in the parity block locality method, n=32, k=20, r=2, and all data blocks and parity blocks in the stripe are placed on different racks; when a data block $D_1$ on a rack 1 fails, the data block $D_1$ can be repaired through a data block $D_2$ and a local parity block $P_1[1-2]$ in a local group 1, so a total of 2 data blocks are transmitted across racks. In the topological locality method, n=33, k=20, z=8, all data blocks and parity blocks in the stripe are evenly placed on 8 racks, and the parity blocks are all placed in the same rack. When the data block $D_1$ on the rack 1 fails, the data blocks $D_2$ and $D_3$ can be obtained through the intra-bandwidth in rack 1, meanwhile, in each remaining rack (except the rack where the parity block is placed), the XOR value of all the data blocks of the stripe on this rack is required to be calculated and then transmitted to the rack 1, and a parity block $Q_1[1-20]$ transmitted to the rack 1 in combination with the parity block rack can complete the repair of data block $D_1$, so a total of 7 data blocks are transmitted across racks.

The technical solution of the invention is illustrated as follows.

The invention provides a wide stripe data storage, and the stripe is (n, k, r, z), including local groups and a global group. The global group includes a rack for storing global parity blocks; each local group includes $$\frac{r+1}{c}$$

racks, and different storage nodes are disposed in each rack. Data blocks or local parity blocks are stored at different storage nodes, and the total number of data blocks and local parity blocks in each rack is c.

Each local group stores a local parity block and r data blocks; the number of the storage node in each rack is equal to c; based on the fault-tolerant attribute of the rack, c is less than or equal to node fault-tolerant capability f of the wide stripe; n is the total number of all data blocks and parity blocks in a stripe; k is the number of the data block in the wide stripe; the number of global parity blocks is f−1; z is the total number of racks.

The wide stripe data storage provided by the invention supports multiple stripes to adopt the encoding technology at multiple nodes synchronically.

Based on the wide stripe data storage provided by the invention, the invention provides a constructing method of the wide stripe data storage, including steps as follows:

trading off the storage overhead $$\frac{k + \lceil k/r \rceil + f - 1}{k}$$

of the stripe and the repair overhead $$\frac{r+1}{f} - 1$$

across racks based on the parameters of the stripe, and disposing the data blocks in each local group, where the parameters include the total number n of all data blocks and parity blocks in a stripe, k data blocks in a wide stripe, and the node fault-tolerant capability f; considering the rack fault-tolerant attribute and data block repair overhead, the number of data blocks stored in each rack is set;

calculating the number of racks in each local group based on the number of data blocks in each local group and the number of data blocks owned by each rack;

by the Azure-LRC method, performing a linear encoding on all data blocks of each local group to generate the local parity block; and calculating the global parity block in the global group by RS encoding of the Cauchy matrix;

where the global parity block is placed at different storage nodes in the same rack.

Preferably, the constructing method of the local parity block and the global parity block includes:

randomly selecting multiple nodes in a rack, and dividing the data blocks in the stripe into local groups in sequence;

distributing the data blocks of all local groups to the nodes in the same rack in sequence by using the local group as a unit;

by the Azure-LRC method, performing the linear encoding on all data blocks of the first local group to generate the local parity blocks and f−1 intermediate results in the local group; where the f−1 intermediate results are transmitted to the next local group;

by the Azure-LRC method, encoding the data blocks in its own local group to generate the corresponding local parity block at the node where the next local group is located, and using the f−1 intermediate results generated by the previous local group to generate new f−1 intermediate results; where the f−1 intermediate results generated by the next local group are transmitted to the next local group;

and so on, until all local groups complete the corresponding local parity block, and using the f−1 intermediate results generated by the last local group as the global parity block; and distributing data blocks, local parity blocks, and global parity blocks to corresponding racks.

Preferably, the updating method of the global parity block includes steps as follows:

a. generating a difference data block on the storage node where the updated data block is located;

b. transmitting the difference to any storage node of the rack of the global group by transmission across racks;

c. using the difference to update the global parity block of the storage node in step b;

d. transmitting the difference from the storage node in step b to the storage node of the remaining global parity blocks through the intra-bandwidth in the rack;

e. using the difference to update the remaining global parity blocks.

Preferably, the method for replacing the rack of the local parity block includes:

taking the local group as a unit, adding 1 to the number of updates of the corresponding rack when the data block in each rack is updated;

comparing the number of updates of each rack in the local group every preset time period, and changing the positions of the local parity block in the local group and any data block in the rack with the most frequent update.

Preferably, the repairing method of the data block in the local group includes:

in the local group, selecting a non-failed storage node as the requestor in the rack where the failed data block is located, and selecting a storage node in other racks each as the local repairer;

through the local repairer, collecting all the data blocks and local parity blocks of the same stripe in the rack where it is located, calculating the XOR value, and transmitting the XOR value to the requestor;

through the requestor, collecting the remaining data blocks and local parity blocks in the rack except the failed data block, and combining all the XOR values transmitted by the local repairer to decode and obtain the failed data block.

The repairing method of the storage nodes is as follows:

recording all nodes ID that have recently acted as the requestor and the local repairer through an LRU double-linked list;

using a hash table to map the real addresses of the nodes that have acted as the requestor and the local repairer in the LRU double-linked list;

selecting the nodes that have not acted as the requestor and the local repairer recently as requestor and local repairer when repairing the next data block.

Based on the wide stripe data storage provided by the invention, the invention provides a corresponding updating method of a global parity block, comprising the following steps:

a. generating a difference data block on the storage node where the updated data block is located;

b. transmitting the difference to any storage node of the rack of the global group by transmission across racks;

c. using the difference to update the global parity block of the storage node in step b;

d. transmitting the difference from the storage node in step b to the storage node of the remaining global parity blocks through the intra-bandwidth in the rack;

e. using the difference to update the remaining global parity blocks.

Based on the wide stripe data storage provided by the invention, the invention provides a corresponding updating method of a local parity block, including the following steps:

taking the local group as a unit, adding 1 to the number of updates of the corresponding rack when the data block in each rack is updated;

comparing the number of updates of each rack in the local group every preset time period, and changing the positions of the local parity block in the local group and any data block in the rack with the most frequent update.

Based on the wide stripe data storage provided by the invention, the invention provides a repairing method of a data block in a corresponding local group, including the following steps:

in the local group, selecting a non-failed storage node as the requestor in the rack where the failed data block is located, and selecting a storage node in other racks each as the local repairer;

through the local repairer, collecting all the data blocks and local parity blocks of the same stripe in the rack where it is located, calculating the XOR value, and transmitting the XOR value to the requestor;

through the requestor, collecting the remaining data blocks and local parity blocks in the rack except the failed data block, and combining all the XOR values transmitted by the local repairer to decode and obtain the failed data block.

Based on the wide stripe data storage provided by the invention, the invention provides a repairing method of storage nodes in a corresponding local group, including the following steps:

recording all nodes ID that have recently acted as the requestor and the local repairer through an LRU double-linked list;

using a hash table to map the real addresses of the nodes that have acted as the requestor and the local repairer in the LRU double-linked list;

selecting the nodes that have not acted as the requestor and the local repairer recently as requestor and local repairer when repairing the next data block.

Embodiment

The invention combines the method of parity block locality and topology locality, and the technical solutions of the invention are further illustrated in the subsequent paragraphs in conjunction with specific embodiments.

Figure 2:
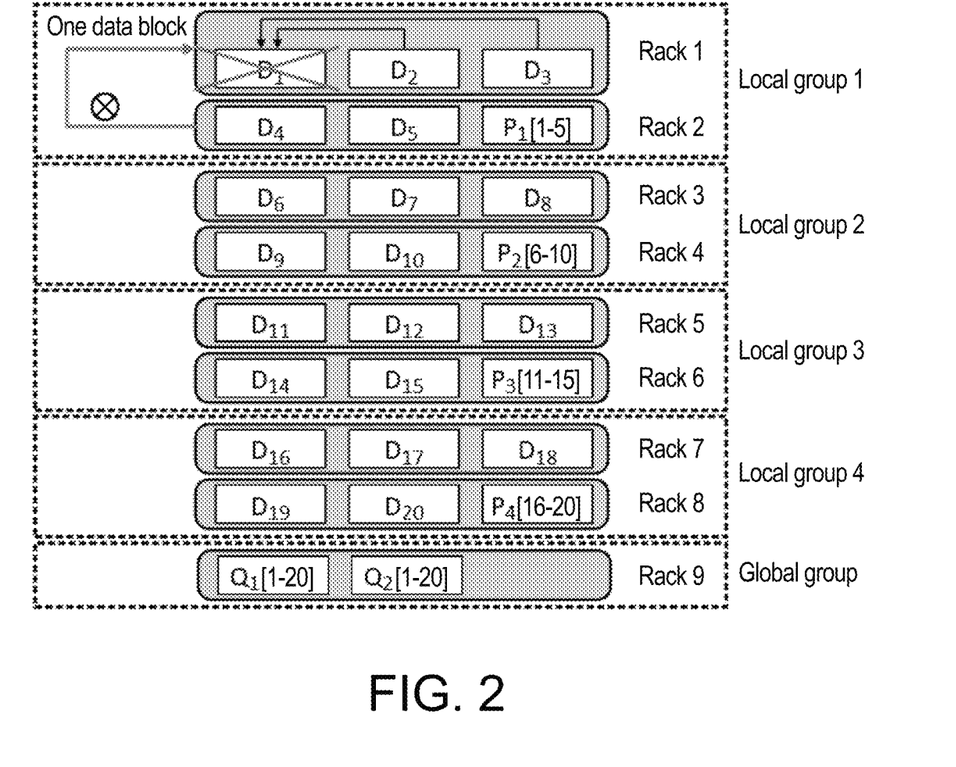
FIG. 2 is a structure diagram of a wide stripe provided by the invention.

(1) Steps to Configure a Wide Stripe (26, 20, 5, 9) are Illustrated as Follows:

as shown in FIG. 2, in the embodiment, configuring a wide stripe with 20 data blocks and the required node fault-tolerant capability of 3;

trading off the storage overhead of wide stripes and cross-rack repair overhead, and disposing 5 data blocks in each local group;

to minimize the data block repair overhead, disposing 3 data blocks stored in different storage nodes in each rack;

based on the number of data blocks in each local group and the number of data blocks owned by each rack, calculating that 2 racks are disposed in each local group;

selecting the Azure-LRC method, performing the linear encoding on the 5 data blocks of each local group to generate a local parity block; and calculating the 2 global parity blocks in the global group by the RS encoding of the Cauchy matrix, where two global parity blocks are placed at different storage nodes in the same rack to form the global group.

(2) Steps to Repair Data Blocks

Figure 3:
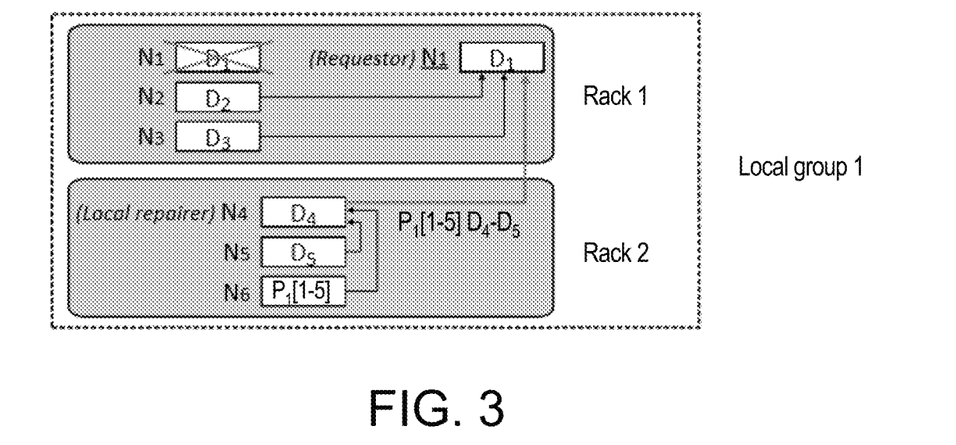
FIG. 3 is a flowchart of a repairing data block $D_1$ of a local group 1 provided by an embodiment of the invention.

As shown in FIG. 3, the steps of repairing a data block are illustrated by repairing a single data block $D_1$ within the local group 1: first, in the local group, a storage node $N_1$ is selected as the requestor for the failed data block in the rack 1 where it is located to collect the remaining two data blocks $D_2$ and $D_3$ in the rack and combined with the XOR value obtained by the local repairer on rack 2, and the obtained failed single data block $D_1$ is decoded; the method for obtaining the XOR value includes: selecting a node $N_4$ in rack 2 as the local repairer, collecting all data blocks $D_5$ and local parity blocks $P_1[1-5]$ of the same stripe in the rack, and calculating XOR value $P_1[1-5]-D_4-D_5$.

For node repair, reasonable scheduling and configuration of one requestor and multiple local repairers used in the repair of a single data block are adopted; the details are as follows: recording all nodes ID that have recently acted as the requestor and the local repairer through an LRU double-linked list; using a hash table to map the node ID and the real address of the node in the LRU double-linked list, so that the node search overhead when configuring the node is O(1) time complexity.

(3) Steps to Encode Data Blocks

Figure 4:
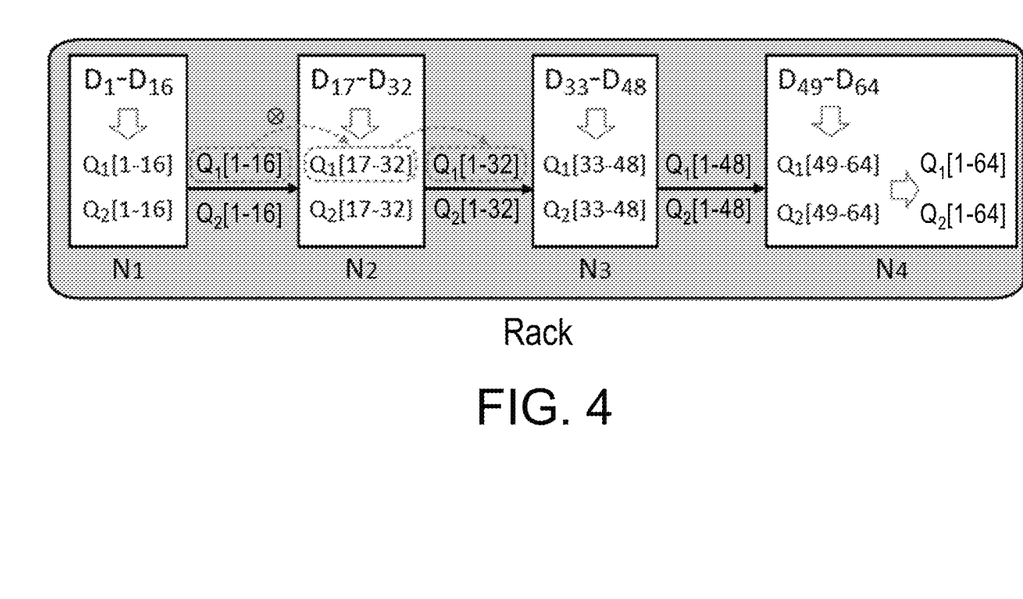
FIG. 4 is a schematic diagram of multi-node encoding provided by an embodiment of the invention.

The encoded data block aims for the generation of local parity blocks and global parity blocks. The traditional encoding data block is to collectively encode k data blocks of a stripe on a node; when k is too large, the encoding performance may drop rapidly. Therefore, in the embodiment, as shown in FIG. 4, parallel encoding can be performed by 4 nodes $N_1$, $N_2$, $N_3$ and $N_4$ in the same rack; the 64 data blocks in the wide stripe are divided into 4 local groups in sequence, the data blocks of all local groups are distributed to the 4 nodes of the same rack in sequence by using the local group as a unit, the data block of the first local group stored locally is encoded to generate a local parity block and two intermediate results, where the 2 intermediate results are forwarded to the node where the next local group is located; the node where the next local group is located not only encodes the data block of this local group to generate a local parity block but also generates two new intermediate results in combination with the two received intermediate results as well as continue to forward to the node where the next local group is located, until all local groups are traversed and 2 global parity blocks $Q_1[1-64]$ and $Q_2[1-64]$ are obtained; the data blocks, local parity blocks, and global parity blocks of each local group in the four nodes are distributed to the corresponding racks.

(4) Steps to Update the Parity Block

Figure 5:
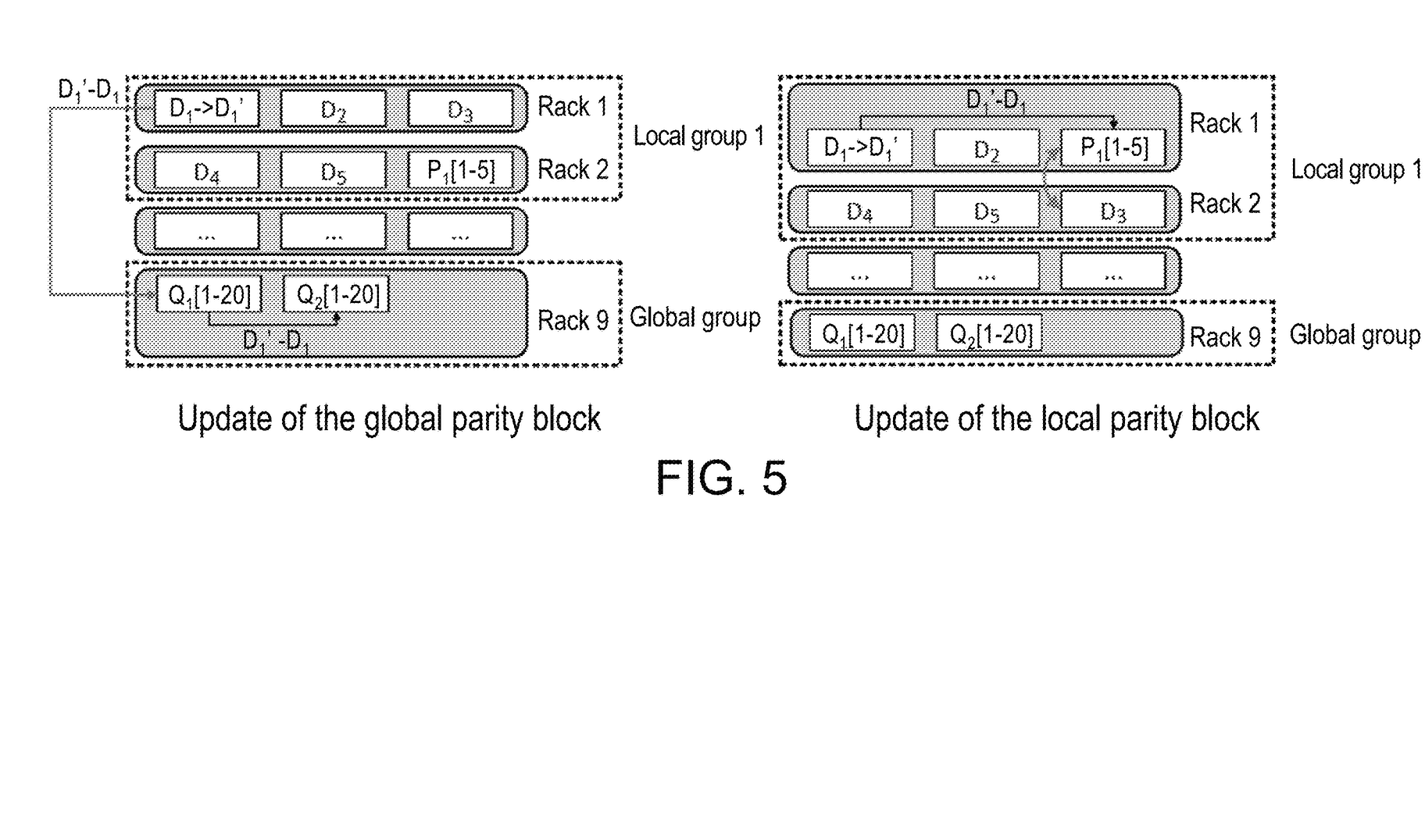
FIG. 5 is a schematic diagram of updating a parity block inside a rack provided by an embodiment of the invention.

As shown in FIG. 5, for the update of the global parity block, first the difference data blocks $D_1'-D_1$ are generated at the storage node where the updated data block $D_1$ is located; and then the difference data blocks $D_1'-D_1$ are transmitted across the rack to a storage node of the rack of the global group to update a global parity block $Q_1[1-64]$ of the storage node, and the difference data blocks are transmitted to the storage nodes of the remaining global parity blocks through the bandwidth in the rack; the remaining global parity block nodes receive the difference data blocks and update the global parity blocks to complete the update.

For the update of the local parity block, the rack frequency metadata of the local groups are configured, and whenever a data block is updated, 1 is added to the number of updates of the rack of the storage node corresponding to the data block. After a period of time, by exchanging the position of the local parity block with the position of a random data block with the most frequent update in the rack, the local parity block being updated inside the rack is implemented.

Compared with the prior art, the invention has the following advantages.

In the method and structure for reliable storage of data with low overhead based on wide stripes provided by the invention, by combining parity block locality and topology locality (a local group includes multiple racks, and the racks include multiple storage nodes), the repair overhead of the data block accordingly can be effectively reduced, and both the repair overhead and the storage overhead are reduced compared with those of the prior art.

In the invention, by analyzing a repair parameter r (data blocks of a local group obtained by trading off the repair overhead and the storage overhead) for configuring a data block, the trade-off between the storage overhead and the repair overhead across racks is implemented, and this provides the storage service provider with the optimal solution for configuring parameters in different scenarios.

The wide stripe data storage provided by the invention supports multiple stripes to adopt the encoding technology at multiple nodes synchronically (the configuration of the local parity block and the global parity block in the invention supports synchronic execution of multiple stripes, and multiple nodes on the same rack to encode data blocks of different local groups respectively can be adopted) rather than the encoding technology of the prior art in which all data blocks are encoded at the same node, which improves the encoding efficiency of data blocks in a wide stripe.

In the invention, the method for updating the parity block inside the rack for the local parity block and the global parity block is adopted, which improves the update efficiency of the data blocks in the wide stripe. Specifically, in the update of the global parity block, the difference data block is transmitted across racks to any storage node in the rack of the global group for one time. Subsequently, the difference is transmitted to the storage nodes of the remaining global parity blocks through the intra-bandwidth in the racks of the global group, and compared with the prior art, the update of the global parity block is applicable to the transmission across racks, which improves the update efficiency of the global parity block. In the update of the parity blocks of the local group, the positions of the local parity block in the local group and any data block in the rack with the most frequent update are exchanged every preset time period, which also reduces the number of transmissions across racks and improves the update efficiency of local parity blocks.

In the prior art, both n and k in (n, k) of the stripe are not very wide because larger values of n and k cannot be compatible with lower repair overhead and lower storage overhead synchronically. However, the wide stripe data storage and method provided by the invention not only can support the values of n and k to be in the order of hundreds but also can ensure that the repair overhead and storage overhead are kept low.

Those skilled in the art can easily understand that the foregoing descriptions are only the preferred embodiments of the invention and are not intended to limit the invention. Any modification, equivalent replacement and improvement, and so on made within the spirit and principle of the invention shall be included in the protection scope of the invention.

What is claimed is:

1. A wide stripe data storage, characterized in that a stripe is (n, k, r, z) and comprises local groups and a global group; n is a total number of all data blocks and parity blocks in the wide stripe, k is a number of all data blocks in the wide stripe, r is a number of data blocks included in each of the local groups, z is a total number of racks,
a node fault-tolerant capability of the wide stripe is f;
the global group comprises one rack for storing global parity blocks, and a number of the global parity blocks is f−1; each of the local groups comprises M racks, and different storage nodes are disposed in each of the racks; each of the storage nodes is used to store one of the data blocks or a local parity block;
in a case that each of the local groups stores the one local parity block and r data blocks and each of the M racks included in each local group is provided with c storage nodes, M=(r+1)/c, wherein one of the M racks uses c−1 storage nodes to store c−1 data blocks and uses one storage node to store one local parity block, and each of remaining racks uses c storage nodes to store c data blocks,
based on a fault-tolerant attribute of the rack, c is less than or equal to the node fault-tolerant capability f.

2. The wide stripe data storage according to claim 1, wherein the wide stripe data storage supports a plurality of stripes to adopt an encoding technology at a plurality of nodes synchronically.

3. A constructing method of the wide stripe data storage according to claim 1, comprising steps as follows:
trading off a storage overhead $$\frac{k + \lceil k/r \rceil + f - 1}{k}$$

of the stripe and a repair overhead $$\frac{r+1}{f} - 1$$

across racks based on parameters of the stripe, and disposing the data blocks in each local group, where the parameters comprise a total number n of all data blocks and parity blocks in the stripe, k data blocks in the wide stripe, and the node fault-tolerant capability f;
when considering a rack fault-tolerant attribute and a data block repair overhead, setting a number of the data blocks stored in each rack;
calculating a number of racks in each local group based on a number of the data blocks in each local group and the number of the data blocks owned by each rack;
by an Azure-LRC (Locally Repairable Code) method, performing a linear encoding on all data blocks of each local group to generate the local parity block; and calculating a global parity block in the global group by RS (Reed-Solomon) encoding of Cauchy matrix;
where the global parity block is placed at different storage nodes in a same rack.

4. The constructing method according to claim 3, wherein the constructing method of the local parity block and the global parity block comprises:
randomly selecting a plurality of nodes in one of the racks, and dividing the data blocks in the stripe into the local groups in sequence;
distributing the data blocks of all local groups to the nodes in the same rack in sequence by using the local group as a unit;
by the Azure-LRC method, performing the linear encoding on all data blocks of a first local group to generate the local parity block and f−1 intermediate results in the local group; where the f−1 intermediate results are transmitted to a next local group;
by the Azure-LRC method, encoding the data blocks in its own local group to generate a corresponding local parity block at a node where a next local group is located, and using the f−1 intermediate results generated by the previous local group to generate new f−1 intermediate results; where the f−1 intermediate results generated by the next local group are transmitted to a next local group;
and so on, until all local groups complete corresponding local parity blocks, and using f−1 intermediate results generated by a last local group as the global parity block; and
distributing the data blocks, the local parity blocks, and the global parity blocks to corresponding racks.

5. The constructing method according to claim 3, wherein an updating method of the global parity block comprises steps as follows:
- a. generating a difference data block on a storage node where an updated data block is located;
- b. transmitting a difference to any storage node of the rack of the global group by transmission across racks;
- c. using the difference to update the global parity block of the storage node in step b;
- d. transmitting the difference from the storage node in step b to the storage node of remaining global parity blocks through an intra-bandwidth in the rack;
- e. using the difference to update the remaining global parity blocks; and
- a replacing method of the rack of the local parity block comprises:
  - taking the local group as a unit, adding 1 to a number of updates of the corresponding rack when the data block in each rack is updated;
  - comparing the number of updates of each rack in the local group every preset time period, and changing positions of the local parity block in the local group and any data block in the rack with a most frequent update.

6. The constructing method according to claim 3, wherein a repairing method of the data block in the local group comprises:
- in the local group, selecting a non-failed storage node as a requestor in the rack where a failed data block is located, and selecting a storage node in other racks each as a local repairer;
- through the local repairer, collecting all the data blocks and the local parity blocks of a same stripe in the rack where it is located, calculating an XOR value, and transmitting the XOR value to the requestor;
- through the requestor, collecting remaining data blocks and local parity blocks in the rack except the failed data block, and combining all the XOR values transmitted by the local repairer to decode and obtain the failed data block; and
- a repairing method of the storage nodes comprises:
  - recording all nodes ID that have recently acted as the requestor and the local repairer through an LRU (least recently used) double-linked list;
  - using a hash table to map real addresses of the nodes that have acted as the requestor and the local repairer in the LRU double-linked list;
  - selecting nodes that have not acted as the requestor and the local repairer recently as the requestor and the local repairer when repairing a next data block.

7. An updating method of the global parity block of the wide stripe data storage according to claim 1, comprising steps as follows:
- a. generating a difference data block on the storage node where an updated data block is located;
- b. transmitting a difference to any storage node of the rack of the global group by transmission across racks;
- c. using the difference to update the global parity block of the storage node in step b;
- d. transmitting the difference from the storage node in step b to the storage node of remaining global parity blocks through an intra-bandwidth in the rack;
- e. using the difference to update the remaining global parity blocks.

8. An updating method of the local parity block of the wide stripe data storage according to claim 1, comprising steps as follows:
- taking the local group as a unit, adding 1 to a number of updates of the corresponding rack when the data block in each rack is updated;
- comparing the number of updates of each rack in the local group every preset time period, and changing positions of the local parity block in the local group and any data block in the rack with a most frequent update.

9. A repairing method of the data blocks in the local group of the wide stripe data storage according to claim 1, comprising steps as follows:
- in the local group, selecting a non-failed storage node as a requestor in the rack where a failed data block is located, and selecting a storage node in other racks each as a local repairer;
- through the local repairer, collecting all the data blocks and the local parity blocks of a same stripe in the rack where it is located, calculating an XOR value, and transmitting the XOR value to the requestor;
- through the requestor, collecting remaining data blocks and local parity blocks in the rack except the failed data block, and combining all the XOR values transmitted by the local repairer to decode and obtain the failed data block.

10. A repairing method of the storage node in the local group of the wide stripe data storage according to claim 1, comprising steps as follows:
- recording all nodes ID that have recently acted as a requestor and a local repairer through an LRU double-linked list;
- using a hash table to map real addresses of the nodes that have acted as the requestor and the local repairer in the LRU double-linked list;
- selecting nodes that have not acted as the requestor and the local repairer recently as the requestor and the local repairer when repairing a next data block.

\* \* \* \* \*